United States Patent [19]
Saiki

[11] Patent Number: 6,091,702
[45] Date of Patent: Jul. 18, 2000

[54] METHOD AND APPARATUS FOR SYMBOL SYNCHRONIZATION IN ORTHOGONAL FREQUENCY DIVISION MULTIPLEXING SYSTEMS

[75] Inventor: Takaaki Saiki, Yokosuka, Japan

[73] Assignee: Victor Company of Japan, Ltd., Yokohama, Japan

[21] Appl. No.: 08/890,603

[22] Filed: Jul. 9, 1997

[30] Foreign Application Priority Data

Jul. 31, 1996 [JP] Japan .................................... 8-219242

[51] Int. Cl.[7] ........................................ H04J 11/00
[52] U.S. Cl. ...................... 370/203; 370/210; 375/261; 375/364
[58] Field of Search .................................... 370/203, 206, 370/517; 375/324, 326, 362, 364, 371, 261

[56] References Cited

U.S. PATENT DOCUMENTS

| | | |
|---|---|---|
| 4,575,682 | 3/1986 | Aoyagi et al. . |
| 5,471,464 | 11/1995 | Ikeda ........................................ 370/203 |
| 5,506,836 | 4/1996 | Ikeda et al. ............................. 370/203 |
| 5,559,833 | 9/1996 | Hayet . |
| 5,602,835 | 2/1997 | Seki et al. ................................ 370/206 |
| 5,633,896 | 5/1997 | Carlin et al. ............................. 375/340 |
| 5,657,313 | 8/1997 | Takahashi et al. ...................... 370/491 |
| 5,732,068 | 3/1998 | Takahashi et al. ...................... 370/206 |
| 5,774,450 | 6/1998 | Harada et al. .......................... 370/206 |

FOREIGN PATENT DOCUMENTS

| | | |
|---|---|---|
| 0608024 | 7/1994 | European Pat. Off. . |
| 0682426 | 11/1995 | European Pat. Off. . |
| 0689313 | 12/1995 | European Pat. Off. . |
| 6244818 | 9/1994 | Japan . |

OTHER PUBLICATIONS

Tourtier P J et al: "Multicarrier Modem for Digital HDTV Terrestrial Broadcasting" Signal Processing. Image Communication, vol. 5, No. 5/06, Dec. 1993, pp. 379–403, XP000426711, Amsterdam, The Netherlands.

*Primary Examiner*—Ajit Patel
*Assistant Examiner*—Bob A. Phunkulh
*Attorney, Agent, or Firm*—Pollock, Vande Sande & Amernick

[57] ABSTRACT

High-frequency components are extracted from an OFDM signal. A symbol clock signal is generated in response to the extracted high-frequency components. Specifically, a sample clock signal is generated in response to the OFDM signal. A frequency of the sample clock signal is divided to generate the symbol clock signal from the sample clock signal. A timing of the frequency division is controlled in response to the extracted high-frequency components.

8 Claims, 6 Drawing Sheets

METHOD AND APPARATUS FOR SYMBOL SYNCHRONIZATION IN ORTHOGONAL FREQUENCY DIVISION MULTIPLEXING SYSTEMS

BACKGROUND OF THE INVENTION

1. Field of the Invention

This invention relates to a method and an apparatus for symbol synchronization. This invention particularly relates to a method and an apparatus for generating a symbol sync signal in an OFDM-signal demodulating system.

2. Description of the Related Art

Some of systems for transmitting digital information signals such as digital video signals in limited frequency bands employ orthogonal frequency division multiplexing (OFDM). Examples of digital information signals handled by such OFDM-based transmitting systems are multi-value modulation signals or 256-QAM (quadrature amplitude modulation) signals. In general, OFDM-based transmission is good in suppressing multipath effects and jamming signal effects. Further, the OFDM-based transmission has a good efficiency of frequency use.

Orthogonal frequency division multiplexing (OFDM) employs multiple carriers which are orthogonal with respect to each other. The multiple carriers are modulated in accordance with digital information pieces to be transmitted, respectively. The modulation-resultant multiple carriers are combined into an OFDM signal which has a form as a random signal. Generally, inverse fast Fourier transform (IFFT) is used in generating an OFDM signal. The "orthogonal" multiple carriers mean that the spectrums of carriers neighboring one carrier are null at the frequency of the latter carrier.

Data transmission based on OFDM is executed symbol by symbol. Each OFDM transmission symbol interval is composed of a guard interval and an effective symbol interval. The guard interval precedes the effective symbol interval. The guard interval is used for reducing multipath effects. The effective symbol interval is used for transmitting information (data). A part of information transmitted during the effective symbol interval is also transmitted during the guard interval.

A receiver side subjects a received signal to a windowing process for every symbol. Specifically, the receiver side discards a signal transmitted during a guard interval, and extracts and uses only a signal transmitted during an effective symbol interval. The signal transmitted during the effective symbol interval is demodulated and decoded into original data (original information) by data recovering processes including fast Fourier transform (FFT).

The receiver side implements symbol synchronization which generates a symbol sync signal equal in timing to every effective symbol interval related to a received signal. The windowing process uses the symbol sync signal as timing information of every effective symbol interval, thereby extracting a signal portion transmitted during the effective symbol interval. The accuracy of the timing information, that is, the accuracy of the timing of the extraction of a signal portion, affects the accuracy of the recovered original data.

In a first known way of providing symbol synchronization, a signal to be transmitted is divided into frames each having a predetermined number of 1-symbol-corresponding signal segments. In every frame, a first 1-symbol-corresponding signal segment is set to a null symbol state, and two subsequent 1-symbol-corresponding signal segments are set to form a chirp signal (a sine sweep signal). A receiver side detects a null symbol signal and a chirp signal for every frame, and generates a symbol sync signal in response to the detected null symbol signal and the detected chirp signal. In this case, since only one symbol sync information piece is available during every time interval corresponding to one frame, the symbol sync signal can be updated at a frame frequency equal to a relatively low frequency. Therefore, the symbol sync signal generated by the receiver side tends to be slow in responding to a change.

In a second known way of providing symbol synchronization, symbol sync information is assigned to one carrier among multiple carriers. A receiver side recovers the symbol sync information, and generates a symbol sync signal in response to the recovered symbol sync information. In this case, other carriers tend to interfere with the symbol-sync-information carrier, and conditions of the interference generally change in time domain. The interference as well as the interference condition change reduce the timing accuracy of the symbol sync signal generated by the receiver side.

A third known way of providing symbol synchronization uses the fact that a part of information transmitted during an effective symbol interval is also transmitted during a guard interval. This fact means that a transmitted signal has a symbol-based correlation. A receiver side detects the symbol-based correlation, and generates a symbol sync signal in response to the detected symbol-based correction. In this case, the timing accuracy of the symbol sync signal generated by the receiver side depends on a bit error rate which occurs during signal demodulating and decoding processes.

SUMMARY OF THE INVENTION

It is a first object of this invention to provide an improved method for symbol synchronization.

It is a second object of this invention to provide an improved apparatus for symbol synchronization.

A first aspect of this invention provides an apparatus for an OFDM signal demodulating system, comprising first means for extracting high-frequency components from an OFDM signal; and second means for generating a symbol clock signal in response to the high-frequency components extracted by the first means.

A second aspect of this invention provides an apparatus for an OFDM signal demodulating system, comprising first means for generating a sample clock signal in response to an OFDM signal; second means for dividing a frequency of the sample clock signal generated by the first means to generate a symbol clock signal from the sample clock signal; third means for extracting high-frequency components from the OFDM signal; and fourth means for controlling a timing of the dividing by the second means in response to the high-frequency components extracted by the third means.

A third aspect of this invention is based on the second aspect thereof, and provides an apparatus wherein the fourth means comprises means for converting the high-frequency components into a first pulse signal; means for removing jitter components from the first pulse signal and thereby changing the first pulse signal into a second pulse signal; and means for controlling the timing of the dividing in response to the second pulse signal.

A fourth aspect of this invention is based on the second aspect thereof, and provides an apparatus further comprising fifth means for decoding the OFDM signal; sixth means for deciding whether or not a result of the decoding by the fifth means is normal; and seventh means for selectively maintaining and interrupting the controlling by the fourth means in response to a result of the deciding by the sixth means.

A fifth aspect of this invention provides a method for an OFDM signal demodulating system, comprising the steps of extracting high-frequency components from an OFDM signal; and generating a symbol clock signal in response to the extracted high-frequency components.

A sixth aspect of this invention provides a method for an OFDM signal demodulating system, comprising the steps of generating a sample clock signal in response to an OFDM signal; dividing a frequency of the sample clock signal to generate a symbol clock signal from the sample clock signal; extracting high-frequency components from the OFDM signal; and controlling a timing of the frequency dividing in response to the extracted high-frequency components.

A seventh aspect of this invention is based on the sixth aspect thereof, and provides a method wherein the controlling step comprises converting the high-frequency components into a first pulse signal; removing jitter components from the first pulse signal and thereby changing the first pulse signal into a second pulse signal; and controlling the timing of the dividing in response to the second pulse signal.

An eighth aspect of this invention is based on the sixth aspect thereof, and provides a method further comprising the steps of decoding the OFDM signal; deciding whether or not a result of the decoding is normal; and selectively maintaining and interrupting the controlling in response to a result of the deciding.

DESCRIPTION OF THE PREFERRED EMBODIMENTS

First Embodiment

Data transmission based on OFDM (orthogonal frequency division multiplexing) is executed symbol by symbol. Each OFDM transmission symbol interval is composed of a guard interval and an effective symbol interval. The guard interval precedes the effective symbol interval. An OFDM signal (an orthogonal frequency division multiplexed signal) is divided into successive frames each having a given number of 1-symbol-corresponding signal segments. For example, each frame has 128 1-symbol-corresponding signal segments.

Figure 1:
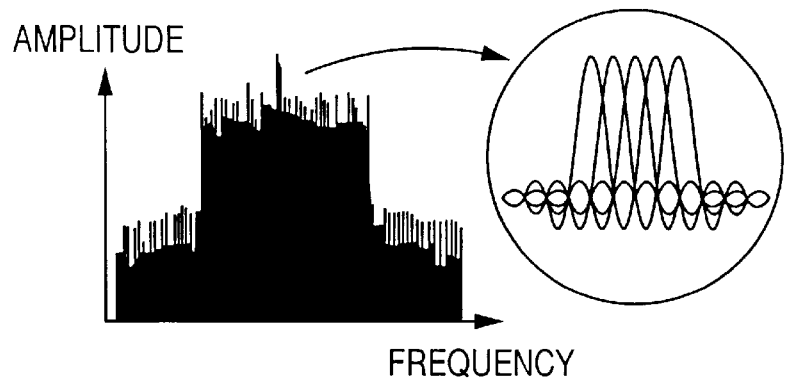
FIG. 1 is a diagram showing an example of the frequency spectrum of an OFDM signal (an orthogonal frequency division multiplexed signal).

FIG. 1 shows an example of the frequency spectrum of an OFDM signal (an orthogonal frequency division multiplexed signal). Multiple carriers are subjected to quadrature amplitude modulation (QAM) responsive to digital information pieces to be transmitted, respectively. The modulation-resultant multiple carriers are combined into an OFDM signal which has a form as a random signal. With reference to FIG. 1, the frequency position of each spectrum peak corresponding to one carrier is coincident with the frequency positions of spectrum nulls corresponding to other carriers. This means that the multiple carriers are orthogonal with respect to each other.

Figure 2:
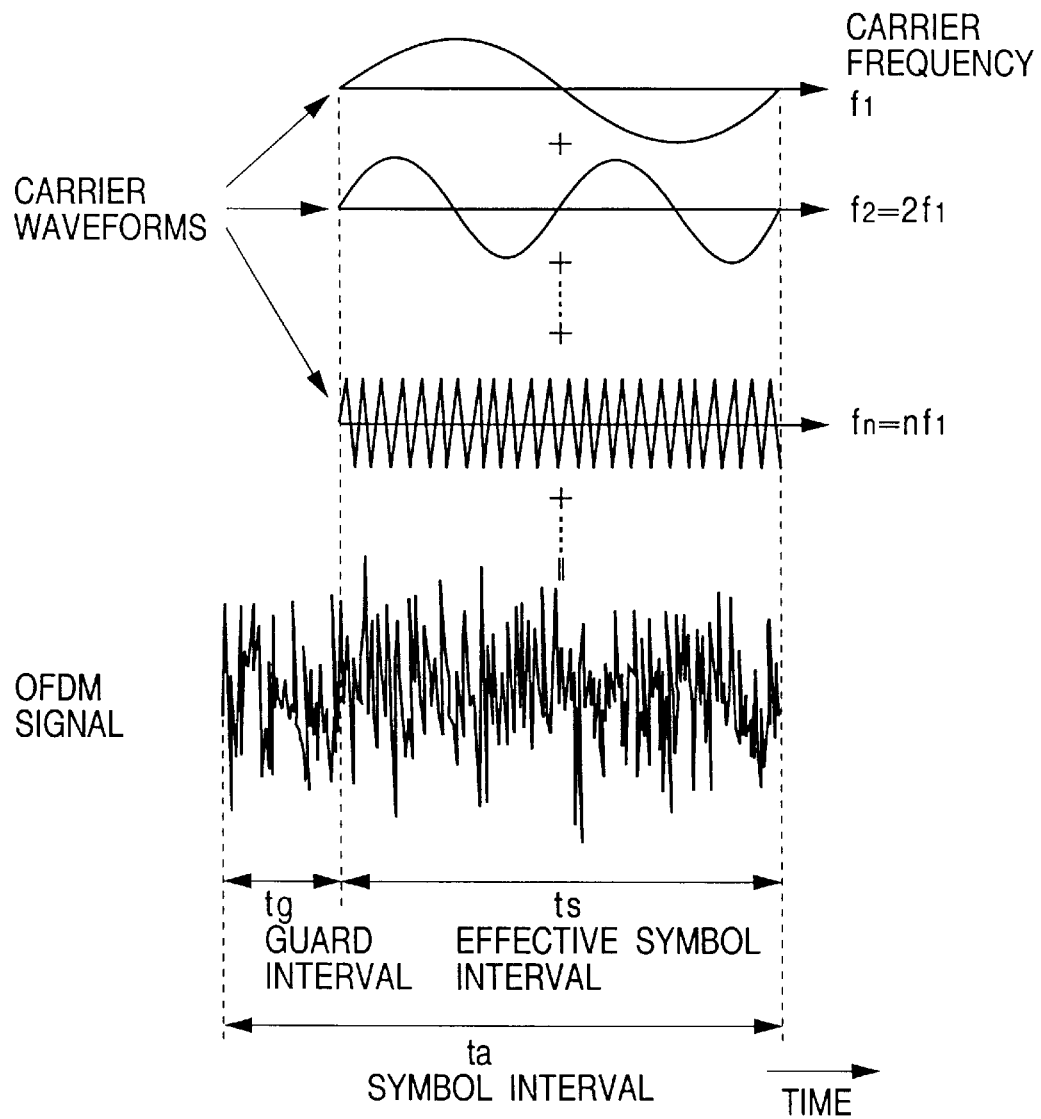
FIG. 2 is a time-domain diagram of an example of an OFDM signal, and carriers in the OFDM signal.

With reference to FIG. 2, the lowest frequency among the frequencies of multiple carriers for an OFDM signal is defined as a fundamental frequency f1. An effective symbol interval "ts" is set equal to one period of the fundamental-frequency carrier. The frequencies "fn" of the other carriers are equal to integral multiples of the fundamental frequency f1. Thus, fn=n·f1, where "n" denotes natural numbers.

As shown in FIG. 2, each transmission 1-symbol interval "ta" related to an OFDM signal is composed of a guard interval "tg", and an effective symbol interval "ts" following the guard interval "tg". Information to be transmitted is placed in effective symbol intervals. A signal transmitted during each guard interval is a copy of a portion of a signal transmitted during an effective symbol interval immediately following the guard interval.

A baseband OFDM signal is generated by executing IFFT (inverse fast Fourier transform) using N complex numbers during every 1-symbol interval, where N denotes a predetermined integer called an IFFT size.

An example of basic specifications of a signal transmission system is as follows. The central carrier frequency in an RF band is equal to 100 MHz. The central carrier frequency in an IF band is equal to 10.7 MHz. The transmission band width is equal to 100 KHz. The modulation is of the 256-QAM OFDM type. The number of used carriers is equal to 257. A predetermined number of carriers among the 257 carriers are used for transmitting main data (main information). The predetermined number is equal to, for example, 248. The IFFT size corresponds to 512. The 1-symbol interval is equal to about 2.6 ms.

Figure 3:
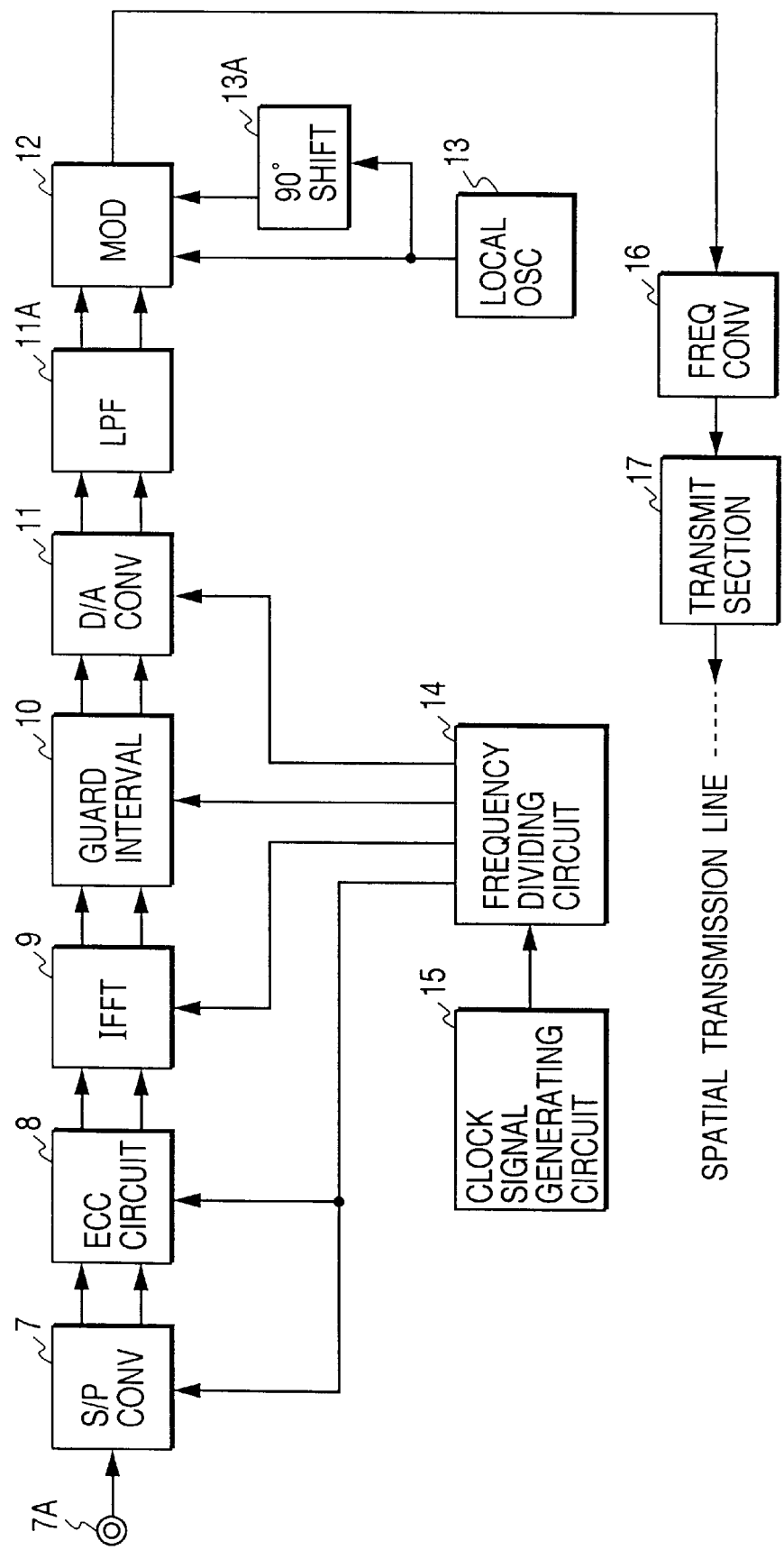
FIG. 3 is a block diagram of a transmitter for an OFDM signal according to a first embodiment of this invention.

With reference to FIG. 3, a transmitter for an OFDM signal includes a serial-to-parallel (S/P) converter 7 following a transmitter input terminal 7A. An input digital information signal in the form of a bit stream is fed via the transmitter input terminal 7A to the S/P converter 7. The input digital information signal represents main information to be transmitted. The input digital information signal results from, for example, compressing an audio information signal, a video information signal, or a video/audio information signal according to an MPEG encoding process.

The S/P converter 7 subjects the input digital information signal to serial-to-parallel (S/P) conversion in response to a clock signal fed from a frequency dividing circuit 14. During the S/P conversion, the input digital information signal is divided into blocks corresponding to modulating signals for 256 QAM. The S/P converter 7 outputs the modulating signals to an ECC circuit 8. The ECC circuit 8 adds signals of an error correction code (ECC) to the modulating signals in response to the clock signal fed from the frequency dividing circuit 14. The signals of the error correction code are referred to as the ECC signals. The ECC circuit 8 outputs ECC-added modulating signals.

According to 256 QAM, 16 different levels are defined in an amplitude direction while 16 different levels are defined in an angle direction. In addition, 256 different digital states are assigned to the 256 levels (16 levels multiplied by 16 levels) respectively. Here, 256 different digital states correspond to 8 bits, that is, one byte.

As previously indicated, 248 carriers among 257 carriers are used for transmitting main data (main information). The 9 remaining carriers are used for transmitting reference signals (helper information). The reference signals include calibration signals representing reference data which can be used by a receiver for amplitude correction and phase correction. The reference signals also include a pilot signal and a symbol order number signal.

The ECC circuit 8 outputs 248-byte digital data for every 1-symbol interval. In more detail, the ECC circuit 8 outputs a first set of 248 parallel digital signals each having 4 bits, and a second set of 248 parallel digital signals each having 4 bits for every 1-symbol interval. The first set and the second set correspond to a real part and an imaginary part (an in-phase signal and a quadrature signal, that is, an I signal and a Q signal) respectively.

The 248 output signals from the ECC circuit 8 in each of the real part and the imaginary part are fed to an IFFT (inverse fast Fourier transform) circuit 9. The IFFT circuit 9 operates in response to a clock signal fed from the frequency dividing circuit 14. The IFFT circuit 9 is of the type capable of processing N parallel signals, where N denotes a natural number equal to 512 which is called an IFFT size. A main portion of the IFFT circuit 9 has a set of 512 input terminals for the real part and also a set of 512 input terminals for the imaginary part. The 248 output signals from the ECC circuit 8 in the real part are applied to 248 IFFT-circuit input terminals among the 512 input terminals for the real part, respectively. The 248 output signals from the ECC circuit 8 in the imaginary part are applied to 248 IFFT-circuit input terminals among the 512 input terminals for the imaginary part, respectively. Regarding each of the real part and the imaginary part, a major portion of the operation of the IFFT circuit 9 corresponds to subjecting 248 carriers to 256 QAM responsive to the 248 output signals from the ECC circuit 8 respectively. Regarding the 248 output signals from the ECC circuit 8, the IFFT circuit 9 generates the 248 modulation-resultant signals in each of the real part and the imaginary part. The IFFT circuit 9 combines the 248 modulation-resultant signals and other modulation-resultant signals of the real part into a multiplexing-resultant signal corresponding to the real part. The IFFT circuit 9 outputs the multiplexing-resultant signal corresponding to the real part. Also, the IFFT circuit 9 combines the 248 modulation-resultant signals and other modulation-resultant signals of the imaginary part into a multiplexing-resultant signal corresponding to the imaginary part. The IFFT circuit 9 outputs the multiplexing-resultant signal corresponding to the imaginary part.

The 512 input terminals of the main portion of the IFFT circuit 9 for each of the real part and the imaginary part correspond to 512 different carriers respectively. Real-part information pieces applied to the input terminals of the main portion of the IFFT circuit 9 for the real part and imaginary-part information pieces applied to the input terminals of the main portion of the IFFT circuit 9 for the imaginary part are carried by the corresponding carriers respectively.

Given signals are fed to a pair of a real-part input terminal and an imaginary-part input terminal of the main portion of the IFFT circuit 9 which correspond to a first specified carrier having a predetermined frequency relation with a sample frequency of the input digital information signal. The given signals are designed to generate a pilot signal which will be carried by the first specified carrier. The pilot signal contains information for providing sample synchronization, that is, information for reproducing a sample clock signal.

Signals representing a variable symbol order number (a updatable symbol order number) are fed to a pair of a real-part input terminal and an imaginary-part input terminal of the main portion of the IFFT circuit 9 which correspond to a second specified carrier. The symbol order number is incremented by "1" for every symbol. The symbol order number is cyclically varied between "1" and "128" in the case where 128 successive symbols compose one frame. Information of the symbol order number will be carried by the second specified carrier.

The output signals of the IFFT circuit 9 are fed to a guard interval setting circuit 10. The guard interval setting circuit 10 provides a guard interval of a given length for every symbol of the output signals of the IFFT circuit 9. The guard intervals are designed to reduce multipath distortions caused by a transmission line. The guard interval setting circuit 10 operates in response to a clock signal fed from the frequency dividing circuit 14.

Output signals of the guard interval setting circuit 10 are fed to a D/A converter 11, being converted into corresponding analog signals thereby. The D/A converter 11 operates in response to a clock signal fed from the frequency dividing circuit 14. The D/A converter 11 outputs the resultant analog signals to an LPF (a low pass filter) 11A. Only components of the output signals of the D/A converter 11 in a desired frequency band are passed through the LPF 11A.

Output signals of the LPF 11A which correspond to the real part and the imaginary part are fed to a quadrature modulator 12 as baseband signals. A local oscillator 13 outputs a given-frequency signal (a 10.7-MHz signal) to the quadrature modulator 12. The frequency of the output signal of the local oscillator 13 is equal to a given intermediate frequency (IF), that is, 10.7 MHz. The local oscillator 13 also outputs the given-frequency signal to a 90° phase shifter 13A. The device 13A shifts the phase of the given-frequency signal by 90°, and outputs the phase-shift-resultant signal to the quadrature modulator 12. In this way, a pair of given-frequency signals having a quadrature relation are fed to the quadrature modulator 12. In the quadrature modulator 12, the quadrature given-frequency signals are modulated in accordance with the baseband signals outputted from the LPF 11A so that the baseband signals are converted into an IF OFDM (intermediate frequency OFDM) signal. The IF OFDM signal has multiple IF orthogonal carriers which are modulated as indications of the output baseband signals of the LPF 11A.

The IF OFDM signal is outputted from the quadrature modulator 12 to a frequency converter 16. The IF OFDM signal is changed by the frequency converter 16 into an RF OFDM (radio frequency OFDM) signal in a desired frequency band for transmission. The central frequency of the RF OFDM signal is equal to 100 MHz. The RF OFDM signal has multiple RF orthogonal carriers which are modulated as indications of the output baseband signals of the LPF 11A respectively. The frequency converter 16 includes a local oscillator and a mixer. In the frequency converter 16, the IF OFDM signal and the output signal of the local oscillator are mixed by the mixer so that the IF OFDM signal is converted into the RF OFDM signal.

The RF OFDM signal is fed to a transmitting section 17 from the frequency converter 16. The transmitting section 17 includes a linear power amplifier and a transmission antenna. The RF OFDM signal is fed via the linear power amplifier to the transmission antenna, being radiated by the transmission antenna into a spatial transmission line (the air).

A clock signal generating circuit 15 outputs a basic clock signal of a predetermined frequency to the frequency dividing circuit 14. The frequency dividing circuit 14 generates the clock signals for the S/P converter 7, the ECC circuit 8, the IFFT circuit 9, the guard interval setting circuit 10, and the D/A converter 11 in response to the basic clock signal.

It is preferable that the clock signal generating circuit 15 produces the basic clock signal in response to the output signal of the local oscillator 13.

Figure 4:
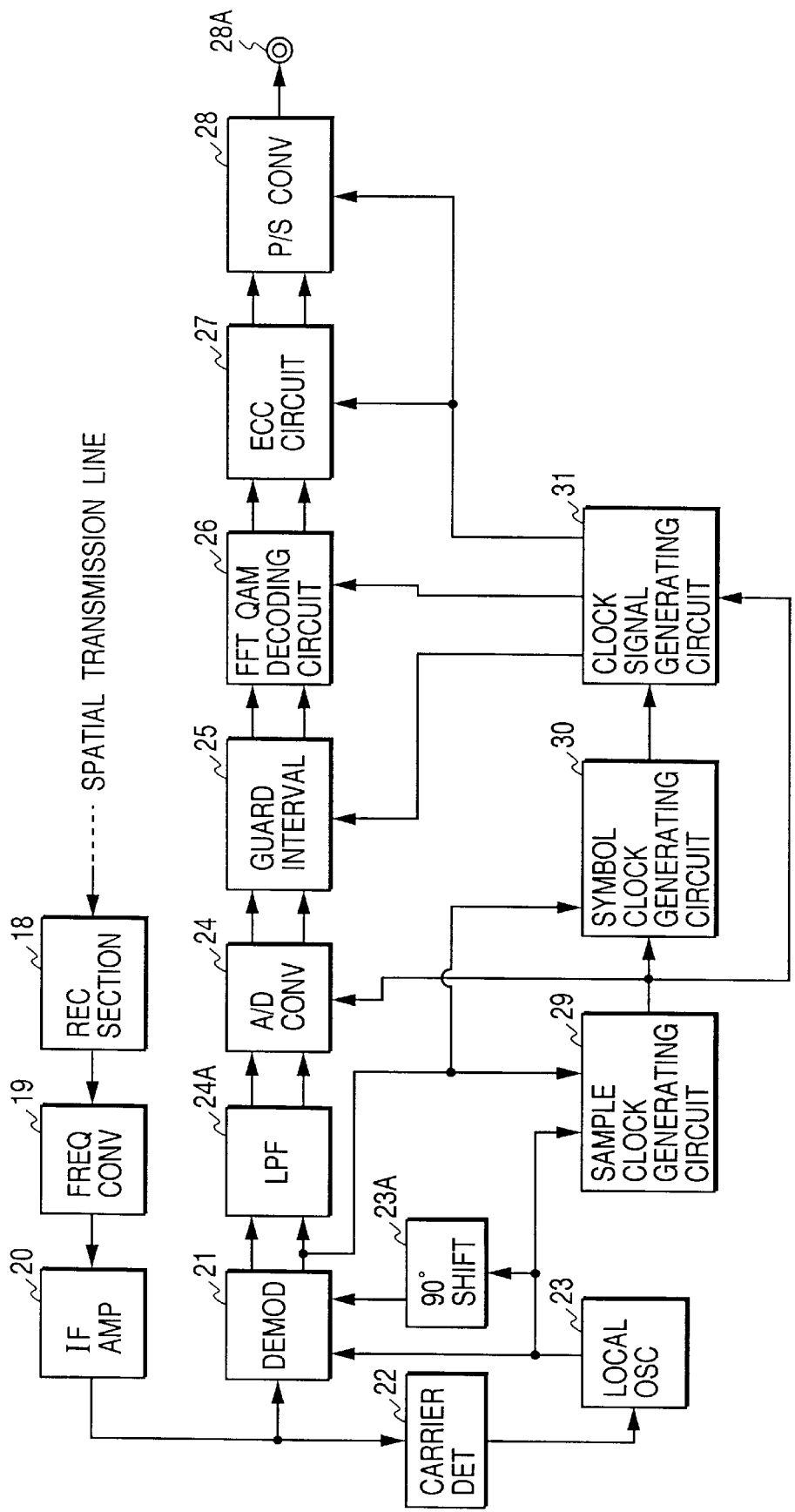
FIG. 4 is a block diagram of a receiver for an OFDM signal according to the first embodiment of this invention.

FIG. 4 shows a receiver for an OFDM signal. The receiver of FIG. 4 is able to accept an RF OFDM signal emitted from the transmitter of FIG. 3. The receiver of FIG. 4 includes a receiving section 18 having a reception antenna which catches an RF OFDM signal sent from, for example, the transmitter of FIG. 3 via the spatial transmission line (the air). The central frequency of the RF OFDM signal is equal to 100 MHz. The RF OFDM signal has multiple RF orthogonal carriers which are modulated in accordance with transmitted baseband signals respectively. The receiving section 18 includes an RF amplifier which enlarges the caught RF OFDM signal.

An output RF OFDM signal from the RF amplifier in the receiving section 18 is fed to a frequency converter 19, being converted into a corresponding IF OFDM signal thereby. The central frequency of the IF OFDM signal is equal to 10.7 MHz. The IF OFDM signal has multiple IF orthogonal carriers which are modulated in accordance with transmitted baseband signals respectively. The frequency converter 19 includes a local oscillator and a mixer. In the frequency converter 19, the RF OFDM signal and the output signal of the local oscillator are mixed by the mixer so that the RF OFDM signal is converted into the IF OFDM signal.

The IF OFDM signal is fed from the frequency converter 19 to an IF amplifier 20, being enlarged to a desired level thereby. The output IF OFDM signal from the IF amplifier 20 is fed to a quadrature demodulator 21 and a carrier detecting circuit 22.

The carrier detecting circuit 22 includes a PLL (phase locked loop) circuit having a combination of a phase comparator (a multiplier), an LPF, a VCO (voltage-controlled oscillator), and a ¼ frequency divider. The PLL circuit recovers the carriers in the IF OFDM signal. An output signal of the carrier detecting circuit 22, which corresponds to the recovered carriers, is fed to a local oscillator 23. The local oscillator 23 is designed to extract the central-frequency carrier among the carriers in the IF OFDM signal with a negligible phase error. The local oscillator 23 outputs a signal corresponding to the extracted central-frequency carrier. Thus, the local oscillator 23 reproduces a local oscillator signal used in a transmitter.

The IF OFDM signal (or the RF OFDM signal) is based on the carriers with frequencies which are spaced at equal intervals. The frequencies of the carriers neighboring the central carrier are spaced from the frequency of the central carrier by only a small frequency interval. Accordingly, it is preferable that the extraction of the central carrier is implemented by a high-selectivity circuit.

The local oscillator 23 uses a high-selectivity circuit. Specifically, the local oscillator 23 includes a PLL circuit for extracting the central carrier from the carriers outputted by the carrier detecting circuit 22. A voltage-controlled oscillator (VCO) in the PLL circuit in the local oscillator 23 uses a voltage-controlled crystal oscillator (VCXO) which can oscillate at a frequency variable in a given small range (for example, ±200 Hz) around the frequency of the central carrier. In addition, an LPF in the PLL circuit has a cutoff frequency adequately low with respect to the frequency intervals between the carriers.

The output signal of the local oscillator 23 is fed to the quadrature demodulator 21. The output signal of the local oscillator 23 is also fed to a 90° phase shifter 23A. The device 23A shifts the phase of the output signal of the local oscillator 23 by 90°. The phase-shift-resultant signal is outputted from the device 23A to the quadrature demodulator 21. In this way, a pair of reproduced local oscillator signals having a quadrature relation are fed to the quadrature demodulator 21. In response to the quadrature signals, the IF OFDM signal is demodulated by the quadrature demodulator 21 into baseband signals corresponding to a real part and an imaginary part (an in-phase signal and a quadrature signal, that is, an I signal and a Q signal) respectively.

Output signals from the quadrature demodulator 21 are fed to an LPF 24A. Only components of the output signals of the quadrature demodulator 21, which occupy a desired frequency band, are passed through the LPF 24A. Output signals of the LPF 24A which have analog forms are fed to an A/D converter 24. The output signals of the LPF 24A are subjected to sampling processes by the A/D converter 24, and are converted by the A/D converter 24 into corresponding digital signals. The A/D converter 24 operates in response to a sample clock signal (a sample sync signal) fed from a sample clock signal generating circuit 29.

One of the output signals of the quadrature demodulator 21 is fed to the sample clock signal generating circuit 29. The output signal of the local oscillator 23 is fed to the sample clock signal generating circuit 29. The sample clock signal generating circuit 29 includes a PLL circuit for generating a signal phase-locked with respect to a pilot signal in the output signal of the quadrature demodulator 21. It should be noted that the pilot signal is carried by the first specified carrier as a continuous signal during every 1-symbol interval containing a guard interval. The sample clock signal generating circuit 29 derives pilot signal frequency information, and reproduces the pilot signal.

In a transmitter, the frequency of the pilot signal is set to correspond to a given ratio between integers with respect to the frequency of the sample clock signal. The sample clock signal generating circuit 29 includes a frequency multiplier operating on the reproduced pilot signal at a multiplying factor corresponding to the above-indicated frequency ratio. The sample clock signal generating circuit 29 recovers the sample clock signal (the sample sync signal) through the frequency multiplication.

The output signals of the A/D converter 24 are fed to a guard interval processing circuit 25. The guard interval processing circuit 25 extracts time-portions of the output signals of the A/D converter 24 which occupy every effective symbol interval. The guard interval processing circuit 25 operates in response to a clock signal fed from a clock signal generating circuit 31. Output signals of the guard interval processing circuit 25 are fed to an FFT QAM (fast Fourier transform, quadrature amplitude modulation) decoding circuit 26.

The FFT QAM decoding circuit 26 subjects the output signals of the guard interval processing circuit 25 to processing which corresponds to complex fast Fourier transform. The FFT QAM decoding circuit 26 operates in response to a clock signal fed from the clock signal generating circuit 31. According to the complex fast Fourier transform processing, the FFT QAM decoding circuit 26 derives the levels of baseband carriers in the real-part signal and the imaginary-part signal outputted from the guard interval processing circuit 25. In the FFT QAM decoding circuit 26, the derived real-part levels and the derived imaginary-part levels are compared with reference demodulation output levels so that the states of transmitted digital signals are determined. In this way, the transmitted digital information is recovered.

Output signals of the FFT QAM decoding circuit 26 which correspond to the recovered digital signals are fed to an ECC circuit 27. The ECC circuit 27 corrects errors in the output signals of the FFT QAM decoding circuit 26 in response to the ECC signals contained therein. The ECC circuit 27 is followed by a parallel-to-serial (P/S) converter 28. The output signals of the ECC circuit 27 (that is, the error-correction-resultant signals) are subjected by the P/S converter 28 to parallel-to-serial (P/S) conversion, being thereby rearranged and combined into a serial-form digital signal. The P/S converter 28 operates in response to a clock signal fed from the clock signal generating circuit 31. The serial-form digital signal is transmitted from the P/S converter 28 to an external device (not shown) via a receiver output terminal 28A.

One of the output signals of the quadrature demodulator 21 is fed to a symbol clock signal generating circuit 30. The sample clock signal is fed from the sample clock signal generating circuit 29 to the symbol clock signal generating circuit 30. The symbol clock signal generating circuit 30 detects the boundaries between guard intervals and effective symbol intervals in response to the output signal of the quadrature demodulator 21. The symbol clock signal generating circuit 30 divides the frequency of the sample clock signal in response to information of the detected boundaries between guard intervals and effective symbol intervals, thereby generating or reproducing a symbol clock signal (a symbol sync signal).

The clock signal generating circuit 31 receives the sample clock signal from the sample clock signal generating circuit 29. The clock signal generating circuit 31 receives the symbol clock signal from the symbol clock signal generating circuit 30. The clock signal generating circuit 31 produces clock signals in response to the output signals of the sample clock signal generating circuit 29 and the symbol clock signal generating circuit 30. The clock signal generating circuit 31 feeds the produced clock signals to the guard interval processing circuit 25, the FFT QAM decoding circuit 26, the ECC circuit 27, and the P/S converter 28 as operation timing control signals.

Figure 5:
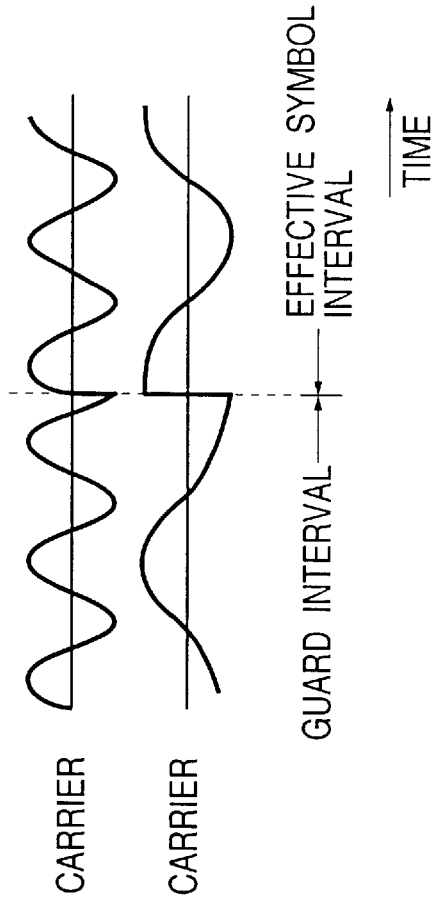
FIG. 5 is a time-domain diagram of an example of carriers in an OFDM signal.

As previously explained, a signal transmitted during each guard interval is a copy of a portion of a signal transmitted during an effective symbol interval immediately following the guard interval. Therefore, as shown in FIG. 5, the waveforms of most of the carriers are discontinuous at the boundaries between guard intervals and effective symbol intervals, that is, at the starting points of effective symbol intervals. The discontinuous waveforms are rich in high-frequency components. The symbol clock signal generating circuit 30 senses high-frequency components of the output signal of the quadrature demodulator 21. The symbol clock signal generating circuit 30 detects the starting points of effective symbol intervals in response to the sensed high-frequency signal components. The symbol clock signal generating circuit 30 converts the sample clock signal into the reproduced symbol clock signal in response to the detected starting points of effective symbol intervals. The reproduced symbol clock signal is locked in phase with effective symbol intervals. The reproduced symbol clock signal accurately represents the starting points of effective symbol intervals.

Figure 6:
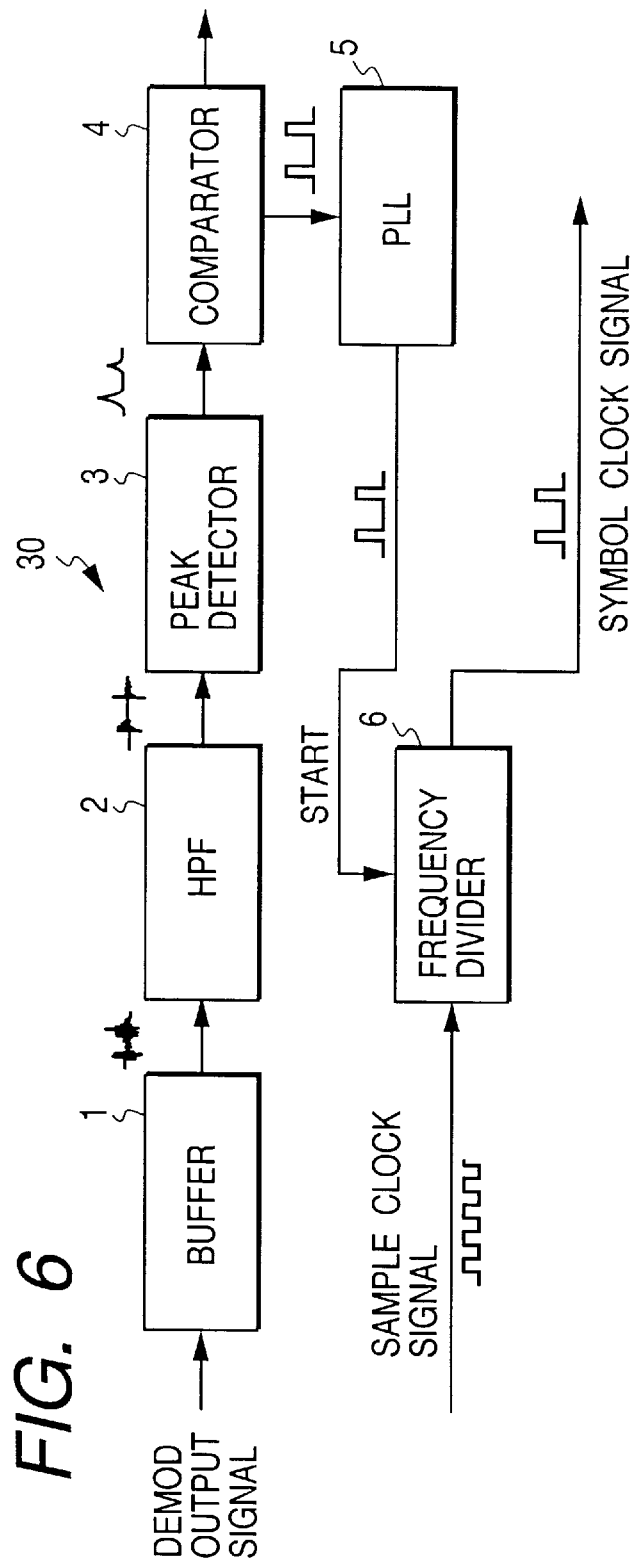
FIG. 6 is a block diagram of a symbol clock signal generating circuit in FIG. 4.

As shown in FIG. 6, the symbol clock signal generating circuit 30 includes a buffer 1, a high pass filter (HPF) 2, a peak detector 3, a comparator 4, a phase locked loop (PLL) 5, and a frequency divider 6. The buffer 1 is successively followed by the HPF 2, the peak detector 3, the comparator 4, and the PLL 5. The PLL 5 is connected to the frequency divider 6.

The output signal of the quadrature demodulator 21 is fed via the buffer 1 to the HPF 2. High-frequency components of the output signal of the quadrature demodulator 21 pass through the HPF 2 while low-frequency components thereof are blocked by the HPF 2. The output signal of the HPF 2 is fed to the peak detector 3. Every peak of the output signal of the HPF 2 is detected by the peak detector 3. The output signal of the peak detector 3 represents the level of every peak of the output signal of the HPF 2. The waveform of the output signal of the peak detector 3 is similar to the positive-side envelope of the output signal of the HPF 2. Accordingly, the peak detector 3 may be replaced by a positive-side envelope detector. The output signal of the peak detector 3 is compared by the comparator 4 with a predetermined reference voltage, being converted into a pulse signal (a binary signal) representing the starting points of effective symbol intervals. The pulse signal is fed from the comparator 4 to the PLL 5. The PLL 5 removes jitter components from the pulse signal. The PLL 5 outputs the resultant jitter-free pulse signal to the frequency divider 6. The jitter-free pulse signal accurately represents the starting points of effective symbol intervals. A loop filter in the PLL 5 has a cutoff frequency chosen to match with a recovery time related to the symbol clock signal. The frequency divider 6 receives the sample clock signal from the sample clock signal generating circuit 29, and divides the frequency of the sample clock signal by a factor equal to, for example, 512. Thereby, the frequency divider 6 generates the symbol clock signal from the sample clock signal. The frequency divider 6 starts every cycle of the frequency dividing process at a timing provided by the output signal of the PLL 5. In other words, the frequency divider 6 uses the output signal of the PLL 5 as a starting signal for every cycle of the frequency dividing process. The symbol clock signal generated by the frequency divider 6 accurately represents the starting points of effective symbol intervals. The symbol clock signal is fed from the frequency divider 6 to the clock signal generating circuit 31.

Second Embodiment

Figure 7:
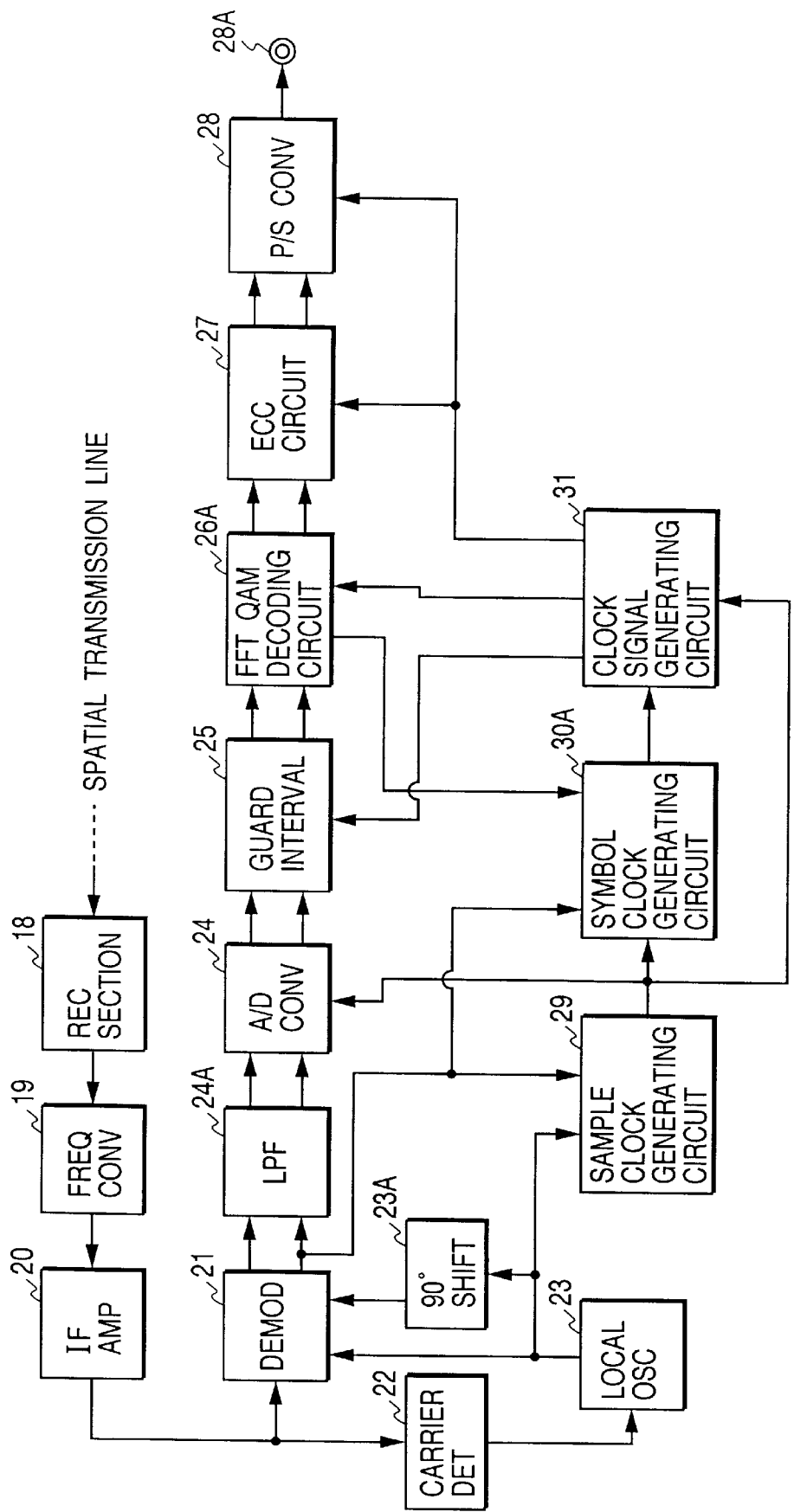
FIG. 7 is a block diagram of a receiver for an OFDM signal according to a second embodiment of this invention.

FIG. 7 shows a portion of a second embodiment of this invention which is similar to the embodiment of FIGS. 1–6 except for design changes explained hereinafter. The embodiment of FIG. 7 includes an FFT QAM decoding circuit 26A and a symbol clock signal generating circuit 30A instead of the FFT QAM decoding circuit 26 and the symbol clock signal generating circuit 30 in FIG. 4.

The FFT QAM decoding circuit 26A includes a digital signal processor (DSP) having a combination of an input/output port, a processing section, a ROM, and a RAM. The FFT QAM decoding circuit 26A operates in accordance with a program stored in the ROM.

The FFT QAM decoding circuit 26A is programmed to implement the following processes. The FFT QAM decoding circuit 26A generates a symbol number decision signal of the binary type. The FFT QAM decoding circuit 26A sets an initial state of the symbol number decision signal to "0". The FFT QAM decoding circuit 26A periodically subjects the output signals of the guard interval processing circuit 25 to the FFT-based decoding process in response to the clock signal fed from the clock signal generating circuit 31. The FFT QAM decoding circuit 26A extracts information of the symbol order number from the results of the decoding process. The information of the symbol order number has been transported to the receiver by the second specified carrier. The FFT QAM decoding circuit 26A periodically decides whether or not the symbol order number is normally updated as "1, 2, 3, 4, . . . ". This decision corresponds to a decision as to whether or not the results of the decoding process are normal. When it is decided that the symbol order number is normally updated, the FFT QAM decoding circuit 26A changes the symbol number decision signal to "1" or holds the symbol number decision signal at "1". When it is decided that the symbol order number is not normally updated, the FFT QAM decoding circuit 26A holds the symbol number decision signal at "0" or resets the symbol number decision signal to "0". The FFT QAM decoding circuit 26A outputs the symbol number decision signal to the symbol clock signal generating circuit 30A.

Figure 8:
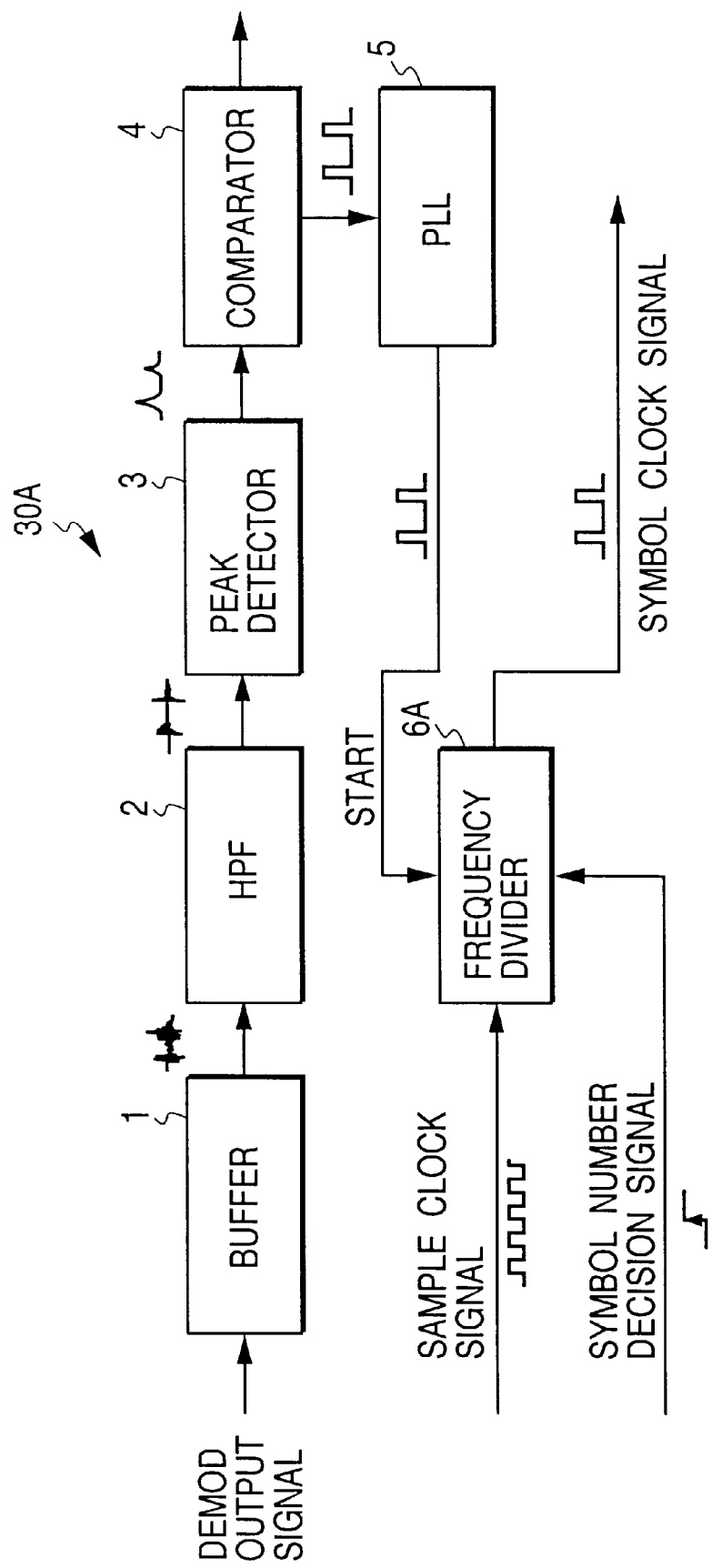
FIG. 8 is a block diagram of a symbol clock signal generating circuit in FIG. 7.

As shown in FIG. 8, the symbol clock signal generating circuit 30A includes a frequency divider 6A instead of the frequency divider in FIG. 6. The frequency divider 6A receives the symbol number decision signal from the FFT QAM decoding circuit 26A. When the symbol number decision signal changes from "0" to "1", that is, when the symbol order number commences to be normally updated, the frequency divider 6A executes the start timing control of the frequency dividing process which responds to the output signal of the PLL 5. When the symbol number decision signal changes from "1" to "0", that is, when the symbol order number commences to be abnormally updated, the frequency divider 6A interrupts the start timing control of the frequency dividing process which responds to the output signal of the PLL 5. In this case, until the symbol number decision signal returns to "1", the frequency divider 6A remains starting every cycle of the frequency dividing process at a timing provided by the output signal of the PLL 5 which occurs immediately before the moment of the change of the symbol number decision signal to "0".

What is claimed is:

1. An apparatus for an OFDM signal demodulating system,
   first means for generating a sample clock signal in response to an OFDM signal;
   second means for dividing a frequency of the sample clock signal generated by the first means to generate a symbol clock signal from the sample clock signal;
   third means for extracting high-frequency components from the OFDM signal;
   fourth means for controlling a timing of the dividing by the second means in response to a high-frequency components extracted by the third means;
   fifth means for decoding the OFDM signal;
   sixth means for deciding whether or not a result of the decoding by the fifth means is normal; and
   seventh means for selectively maintaining and interrupting the controlling by the fourth means in response to a result produced by the sixth means.

2. A method used in an OFDM signal demodulating system comprising the steps of:
   generating a sample clock signal in response to an OFDM signal;
   dividing a frequency of the sample clock signal to generate a symbol clock signal from the sample clock signal;
   extracting high-frequency components from an OFDM signal;
   controlling timing of the frequency dividing in response to the extracted high frequency components;
   decoding the OFDM signal;
   deciding whether or not a result of the decoding is normal; and
   selectively maintaining and interrupting the controlling in response to a result of the deciding.

3. An apparatus for an OFDM signal demodulating system, comprising:
   first means for generating a sample clock signal in response to an OFDM signal;
   second means for dividing a frequency of the sample clock signal generated by the first means to generate a symbol clock signal for symbol synchronization from the sample clock signal;
   third means for extracting high-frequency components from the OFDM signal, the extracted high-frequency components including signal components related to starting points of effective symbol integrals; and
   fourth means for controlling a first timing of the dividing by the second means in response to the symbol-starting-point signal components in the high-frequency components extracted by the third means;
   fifth means for decoding the OFDM signal;
   sixth means for deciding whether or not a result of the decoding by the fifth means is normal; and
   seventh means for selectively maintaining and interrupting the controlling by the fourth means in response to a decision result by the sixth means.

4. A method for demodulating an OFDM signal, comprising the steps of:
   generating a sample clock signal in response to an OFDM signal;
   dividing a frequency of the sample clock signal to generate a symbol clock signal for symbol synchronization from the sample clock signal;
   extracting high-frequency components from the OFDM signal, the extracted high-frequency components including signal components related to starting points of effective symbol intervals;
   controlling a first timing of the frequency dividing in response to the symbol-starting-point signal components in the extracted high frequency components;
   decoding the OFDM signal;
   deciding whether or not a result of the decoding is normal; and
   selectively maintaining and interrupting the controlling in response to deciding whether or not said result of decoding is normal.

5. An apparatus for an OFDM signal demodulating system, comprising:
   first means for extracting high-frequency components from an OFDM signal;
   second means for detecting an envelope of the high-frequency components extracted by the first means;
   third means for detecting discontinuities in carriers of the OFDM signal in response to the envelope detected by the second means; and fourth means for generating a symbol clock signal in response to the discontinuities detected by the third means.

6. An apparatus for an OFDM signal demodulating system, comprising:

first means for generating a sample clock signal in response to an OFDM signal;

second means for dividing a frequency of the sample clock signal generated by the first means to generate a symbol clock signal from the sample clock signal;

third means for extracting high-frequency components from the OFDM signal;

fourth means for detecting discontinuities in carriers of the OFDM signal in response to the high-frequency components extracted by the third means; and fifth means for controlling a timing of the dividing by the second means in response to the discontinuities detected by the fourth means.

7. A method for an OFDM signal demodulating system, comprising the steps of:

extracting high-frequency components from an OFDM signal;

detecting an envelope of the extracted high-frequency components;

detecting discontinuities in carriers of the OFDM signal in response to the detected envelope; and generating a symbol clock signal in response to the detected discontinuities.

8. A method for an OFDM signal demodulating system, comprising the steps of:

generating a sample clock signal in response to an OFDM signal;

dividing a frequency of the sample clock signal to generate a symbol clock signal from the sample clock signal;

extracting high-frequency components from the OFDM signal;

detecting discontinuities in carriers of the OFDM signal in response to the extracted high-frequency components; and controlling a timing of the frequency dividing in response to the detected discontinuities.

* * * * *